April 17, 1956 A. W. BEISHLINE ET AL 2,741,900

SYNCHRO CAM DEVIATION CORRECTOR

Filed March 18, 1953 2 Sheets-Sheet 1

INVENTORS
ALLEN W. BEISHLINE
ROBERT R. REID
BY
ATTORNEYS

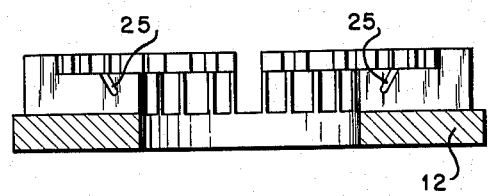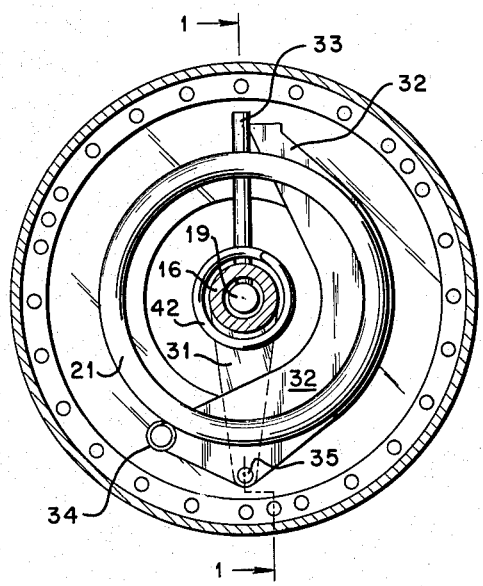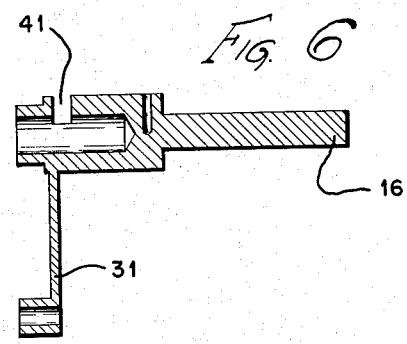

United States Patent Office 2,741,900
Patented Apr. 17, 1956

2,741,900

SYNCHRO CAM DEVIATION CORRECTOR

Allen William Beishline and Robert R. Reid,
Philadelphia, Pa.

Application March 18, 1953, Serial No. 343,268

4 Claims. (Cl. 64—24)

(Granted under Title 35, U. S. Code (1952), sec. 266)

The present invention relates to a synchro cam deviation corrector and more particularly to a device by means of which a synchro shaft may be angularly positioned relative to a coaxially disposed input shaft so that the synchro shaft leads or lags the input shaft at any given point by an arbitrary number of degrees up to a predetermined maximum settting. In addition, means are provided whereby the lead or lag is adjustable at a large number of points spaced circumferentially about the shafts.

Previously known methods of accomplishing deviation corrections involved cam-type compensating devices provided with radially disposed adjustments similar to those shown in U. S. Patent Number 2,308,566. Such devices are necessarily relatively large in diameter and relatively limited as to the number of points of adjustment. In addition, on many of these devices the cam adjusting means are relatively inaccessible, especially when the device is incorporated in complex equipment.

The instant invention incorporates a cam surface comprising a flexible, extensible ring adjustably supported upon a large plurality of bell crank members individually positioned by a series of axially disposed screws, with the result that a relatively large number of adjusting means can be arranged within a compact housing in such a manner that they may be readily adjusted with the deviation corrector in place in the equipment in which it is used.

An object of the present invention is the provision of an extremely compact mechanism for accomplishing deviation correction.

Another object is to provide a deviation correction device in which the compensating cam, by means of which corrections are introduced, may be accurately adjusted at a large number of points around its circumference.

Yet another object of the invention is the provision of a deviation corrector in which the cam adjustment means are so arranged that they may be readily adjusted to modify the cam setting without disassembling the corrector or the equipment in which the deviation corrector is installed.

Other objects and advantages of the invention will become apparent upon consideration of the following description in connection with the accompanying drawings, which illustrate a preferred embodiment, and in which:

Fig. 4 shows a vertical section of the guide ring taken on the line 4—4 of Fig. 3, Fig. 5 is a sectional view taken on line 5—5 of Fig. 1, and Fig. 6 is a longitudinal section taken on the axis of the input shaft and through the link arm attached thereto.

In these drawings, like reference numerals designate like or corresponding parts throughout the several views.

Figure 1:
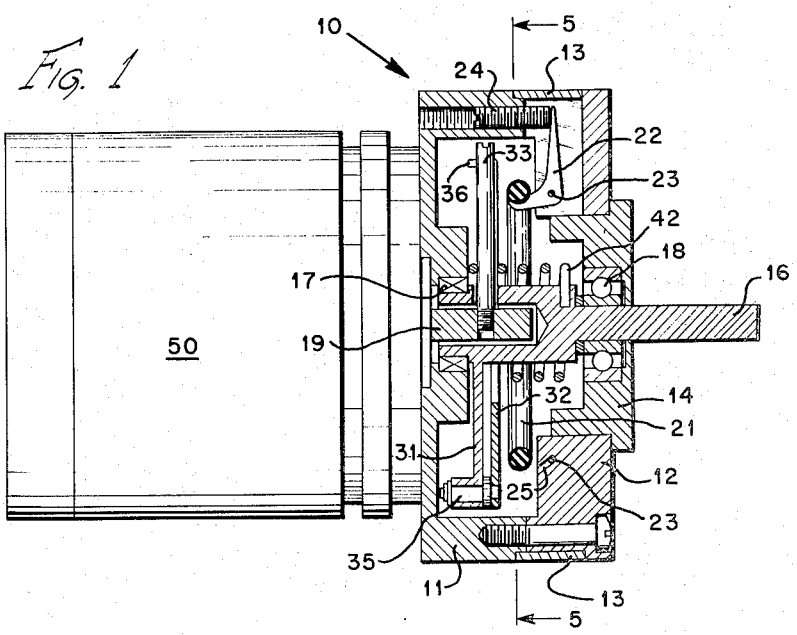
Fig. 1 shows a section of the device taken on the line 1—1 of Fig. 5.

Referring first to Fig. 1, the operating elements of this device are fully enclosed in a cylindrical casing 10 including a synchro base 11, a guide ring 12, a sleeve 13 and a bearing cap 14. These parts may be fastened together by any suitable means. For example, the bearing cap 14 may be pressed into the central opening in the guide ring 12, and the guide ring 12 may be secured to the servo base 11 by machine screws so that the sleeve 13 is retained in suitable circumferential recesses in the ring and the base.

The operating elements within the casing 10 include an input shaft, an output shaft, hereafter referred to as a servo shaft, a variably positioned linkage interconnecting said shafts, and an adjustable cam surface arranged to continuously control the position of said linkage as the input shaft is rotated.

The input shaft 16 is rotatably supported in bearings 17 and 18 mounted in centrally located openings in the synchro base and the bearing cap, respectively. The input shaft is made hollow at the end adjacent to the synchro base so that the synchro shaft 19 of a synchro 50 clamped against the synchro base 11 may be inserted into the hollow portion of the input shaft in the manner shown in Fig. 1. This telescoped arrangement of the shafts results in a very compact device and at the same time permits maximum longitudinal spacing between the bearings supporting the input shaft.

The linkage inter-connecting the input shaft and the synchro shaft as shown in Figs. 1 and 5 includes three primary elements, a link arm 31 extending radially from the input shaft 16, a follower link 32 in the form of a bent lever pivotally connected intermediate of its ends to the outer end of the link arm 31 by means of a pivot 35, and a synchro pin 33 extending radially from the synchro shaft and through a circumferential slot 41 around one side of the hollow portion of the input shaft. For structural details of the input shaft, see particularly Fig. 6. The follower link 32 is fitted at one end with a roller 34 arranged to ride on the outer surface of the cam and at the other end with a bent tab 36 arranged to engage the synchro pin. In order to continuously bias the tab 36 of the follower link 32 into contact with the synchro pin 33 and at the same time maintain contact between the cam surface and the roller 34, a suitably biased spring 42 wound about the input shaft 16 is fixed at one end to the input shaft and at the other to the synchro pin.

Figure 3:
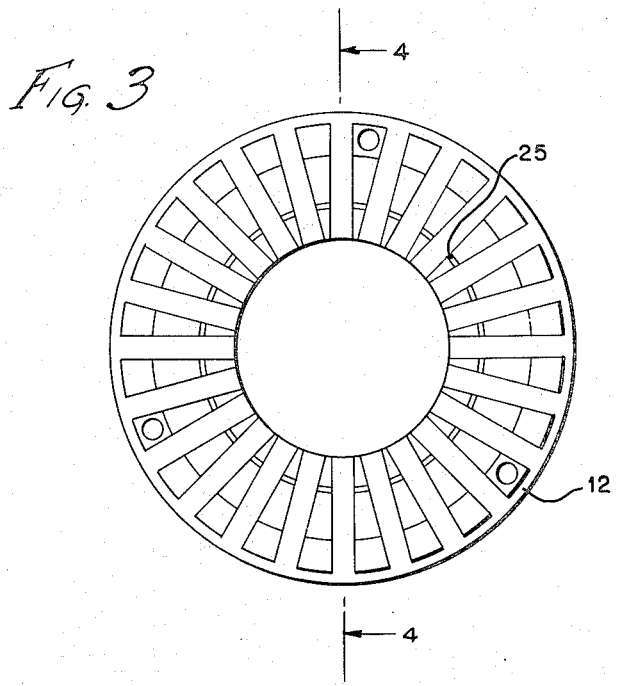
Fig. 3 is a plan view of the guide ring.
Figure 2:
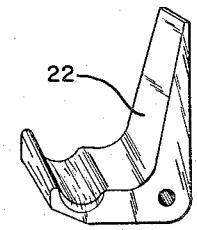
Fig. 2 shows an isometric view of a bell crank member.

The adjustable cam surface is formed by the outer periphery of a flexible, extensible ring 21 which may conveniently comprise either a synthetic rubber O-ring or a steel garter spring with a flattened outer diameter. This ring is supported in the manner shown in Fig. 1 on a plurality of bell cranks 22 shaped as shown in detail in Fig. 2. These bell cranks are pivotally secured in the radial slots of the guide ring 12 shown in detail in Figs. 3 and 4 by means of a spring type pivot ring 23 which is retained by spring bias in the tapered annular slot 25 in ring 12, shown best in Figs. 3 and 4. When the guide ring 12 is secured to the synchro base 11 the radially extending arms of the respective bell cranks 22 are disposed in alignment with the inner ends of corresponding set screws 24 axially adjustable within the synchro base.

In designing and constructing the adjustable cam assembly described above certain critical dimensional relationships and operating limitations were necessarily considered. The dimensions of the O-ring and its supporting bell cranks must be selected so that the O-ring is always under tension even when all of the set screws by means of which the bell cranks are positioned have been fully retracted within the synchro base. In this condition the tension within the O-ring causes all of the bell cranks 22 to rest against the inner end of the bearing cap 14 which acts as a stop. In selecting the non-circular curves which may be set into the device it is not possible to include every curve whose radii fall within the designed minimum or maximum throw of the bell cranks. The fact that the O-ring is held in place on the bell cranks by the tension within the O-ring precludes selection of any curve containing a concave portion. The minimum radius possible at any given point of adjustment is fixed by a straight line tangent to the position of the O-ring segments at the adjacent points of adjustment on eiher side of the given point. An attempt to further withdraw the set screw permits the bell crank to leave the O-ring which then maintains its position tangent to the bell cranks on either side.

In arranging the device disclosed herein for proper operation, several adjustments must first be made. The synchro 50 may conveniently be secured to the synchro base 11 by means of suitable releasable clamps, not shown because they are not a part of the instant invention. When these clamps are loosened the synchro may be turned relative to the synchro base for zero adjustments in the servo loop. Next, each of the cam adjusting means provided should be adjusted to the proper setting. For example, in the form shown, the synchro base is provided with 24 tapped holes equally spaced about its periphery into which 24 socket type set screws are inserted. Since each set screw bears against a corresponding bell crank, movement of the set screw back and forth along its axis causes rotation of the corresponding bell crank about the pivot ring, and thus the particular segment of the O-ring supported by each bell crank is moved radially relative to the input shaft axis either toward or away from the shaft. Therefore, all of the set screws, regardless of the number provided, must be individually adjusted to deform the O-ring into the desired non-circular shape which comprises the required cam surface.

The operation of this device can best be considered in connection with the showing in Fig. 5, wherein the cam 21 is pictured in an exactly circular configuration in the midposition of its radial travel in order to facilitate an understanding of the operational relationship between the various elements of the linkage. Under this special condition the synchro pin 33 is positioned 180° from the link arm 31 of the input shaft and this angular relation will be maintained through 360° of rotation of the input shaft in either direction, provided that the torque applied by the spring 42 is always sufficient to overcome friction drag in the bearings supporting the synchro shaft 19 when the input shaft, as shown in Fig. 5, is rotating in the clockwise direction. These synchro bearings are not shown because the structural details of a conventional synchro are not considered pertinent to the instant invention. Moreover, this friction drag is generally very small in conventional synchros so that it is readily overcome by the spring 42. In view of the location of roller 34 relative to the pivot 35 and to the point of contact between the follower link 32 and the synchro pin 33, radial movement of the roller 34 in response to any deformation of the cam surface from a circular configuration will result in a corresponding change in the relative angular positions of the link arm 31 and the synchro pin 33 and hence will change the instantaneous angular position of the synchro shaft relative to the input shaft as a function of variations in the radial position of successive segments of the variable-profile cam.

In designing the follower link 32 two factors in the positioning of the roller 34 relative to the pivot 35 proved to be of considerable importance. The first factor is the angular offset of the roller relative to the pivot. For rotation counter-clockwise with respect to Fig. 5, the roller will still function satisfactorily at offset angles up to 90°. However, for clockwise rotation, the maximum satisfactory angular offset of the roller is substantially less than 90° because of a tendency for the roller to dig into the cam surface that increases with increased offset angles. In the form of the device shown in Fig. 5 the optimum angular offset proved to be about 30° although operation in either direction of rotation was satisfactory within a range of ±15° from the optimum offset position. The second factor in the positioning of the roller 34 is the location of the axis of rotation of the pivot 35 radially relative to the input shaft 16. In order to minimize adverse influences upon the movement of the roller 34 along the cam surface, it is desirable to minimize deviations from a preferred configuration in which a line tangent to the surface of the cam at the point of contact with the roller passes through the axis of the pivot 35. Accordingly, for best results in this respect, the pivot 35 should be so located on the link arm 31 that the preferred configuration described above is obtained when the cam surface is circular at the point of contact with the roller and midway of its range of radial adjustment. This determination of the best position for the pivot 35 in turn affects the shape and size of the follower link 32.

In a modified form of the follower link the roller 34 is located between the pivot 35 and the tab 36. However, this arrangement necessitates further modifications of the linkage to the extent of reversing the biasing effect of the spring 42 and reversing the relative positions of the tab 36 and the synchron pin 33.

As noted in detail above, the device described herein comprises a compact deviation corrector in which the compensating cam may be accurately adjusted at a large number of points through readily accessible adjusting means.

It should be understood, of course, that the foregoing disclosure relates to a preferred embodiment of the invention for a particular application and that numerous modifications or alterations may be made therein without departing from the spirit and scope of the invention as set forth in the appended claims. For example, the instant invention may also be employed as a function generator. It should also be noted that this device may have widespread utility in many different applications as a compact and accurate power transmitting means characterized by an adjustable cylincally variable output.

The invention described herein may be manufactured and used by or for the Government of the United States of America for governmental purposes without the payment of any royalties thereon or therefor.

What is claimed is:

1. In a deviation corrector including an input shaft and a coaxially disposed output shaft, means for varying the rotational angular relationship between the input and output shafts to conform with a predetermined angular correction, said means comprising a pin secured to the output shaft, a link arm secured to the input shaft, a cam follower link pivotally mounted on the link arm, a cam follower secured to the follower link and a tab secured to the follower link adapted to engage the pin on the output shaft, an adjustable ring-shaped cam, means for continuously urging the cam follower into engagement with the cam and the tab into engagement with the pin, mounting means for said cam comprising a plurality of bell cranks pivotally mounted on a pivot ring, the pivot ring being supported concentrically with respect to the axis of the shafts, one of the arms of the bell cranks extending in a generally longitudinal direction and the other of the arms extending in a generally radial direction with respect to the axis of the shafts, and cam adjusting means operable through the respective bell cranks to position the cam so that it produces the desired angular correction.

2. A device as described in claim 1, and, in addition, an annular supporting member for said cam mounting means having a series of equally spaced radial grooves in which said bell cranks are located and a tapered concentric groove in which said pivot ring is retained by spring bias, said pivot ring being a spring type material biased into a circular shape.

3. In a deviation corrector including an input shaft and an output shaft, the shafts being disposed on a common axis and the ends of the shafts being in close proximity to each other, means for varying the angular rotational relationship between the input and output shafts to conform with a predetermined angular correction, said means comprising a pin secured to the output shaft adjacent the end thereof and extending radially therefrom, a link arm secured to the input shaft adjacent the end thereof and extending radially therefrom, a cam follower link pivotally mounted on the link arm, a roll-type cam follower rotatably mounted on the cam follower link adjacent one end thereof, an integral tab at the opposite end of the cam follower link adapted to engage the pin extending from the output shaft, a plurality of bell cranks pivotally mounted on a pivot ring, the pivot ring being supported concentrically with respect to the axis of the shafts, one of the arms of the bell cranks extending in a generally longitudinal direction and the other of the arms extending in a generally radial direction with respect to the axis of the shafts, a flexible ring-shaped cam mounted on the longitudinally extending arms of the bell cranks, means for pivoting the individual bell cranks thereby deforming the cam to conform with the desired angular correction, and means for continuously urging the cam follower into engagement with the cam and the tab into engagement with the pin.

4. In a deviation corrector, a hollow input shaft having a slot therethrough extending along a portion of its periphery, an output shaft coaxial with said input shaft and arranged so that one end of the output shaft is located within one end of the input shaft, linkage means for varying the angular rotational relationship between the input and output shafts to conform with a predetermined angular correction, said linkage means comprising a pin secured to the output shaft adjacent the end thereof and extending radially therefrom through the slot in the input shaft, a link arm secured to the input shaft adjacent the end thereof and extending radially therefrom, a cam follower link pivotally mounted intermediate of its ends on the outer end of the link arm, a roll-type cam follower rotatably mounted on the cam follower link adjacent one end thereof, an integral tab on the opposite end of the cam follower link arranged to engage the outer end of the pin on the output shaft, a plurality of bell cranks pivotally mounted on a pivot ring, the pivot ring being supported concentrically with respect to the axis of the shafts, one of the arms of the bell cranks extending in a generally longitudinal direction and the other of the arms extending in a generally radial direction with respect to the axis of the shafts, a flexible ring-shaped cam mounted on the longitudinally extending arms of the bell cranks, means for pivoting the individual bell cranks thereby deforming the cam to conform with the desired angular correction, and means for continuously urging the cam follower into engagement with the cam and the tab into engagement with the pin.

References Cited in the file of this patent

UNITED STATES PATENTS

| | | |
|---|---|---|
| 1,767,117 | Brower | June 24, 1930 |
| 1,779,145 | Proctor | Oct. 21, 1930 |
| 1,807,919 | Kolster | June 2, 1931 |
| 2,296,285 | Lear | Sept. 22, 1942 |
| 2,308,566 | Noxon | Jan. 19, 1943 |
| 2,322,031 | Kuebert | June 15, 1943 |
| 2,336,361 | Lear | Dec. 7, 1943 |
| 2,589,852 | Overacker | Mar. 18, 1952 |
| 2,590,287 | Brelsford | Mar. 25, 1952 |